No. 773,739. PATENTED NOV. 1, 1904.
A. M. HIGHSMITH.
CLOVER AND GRASS SEEDER.
APPLICATION FILED MAR. 25, 1904.
NO MODEL. 2 SHEETS—SHEET 1.
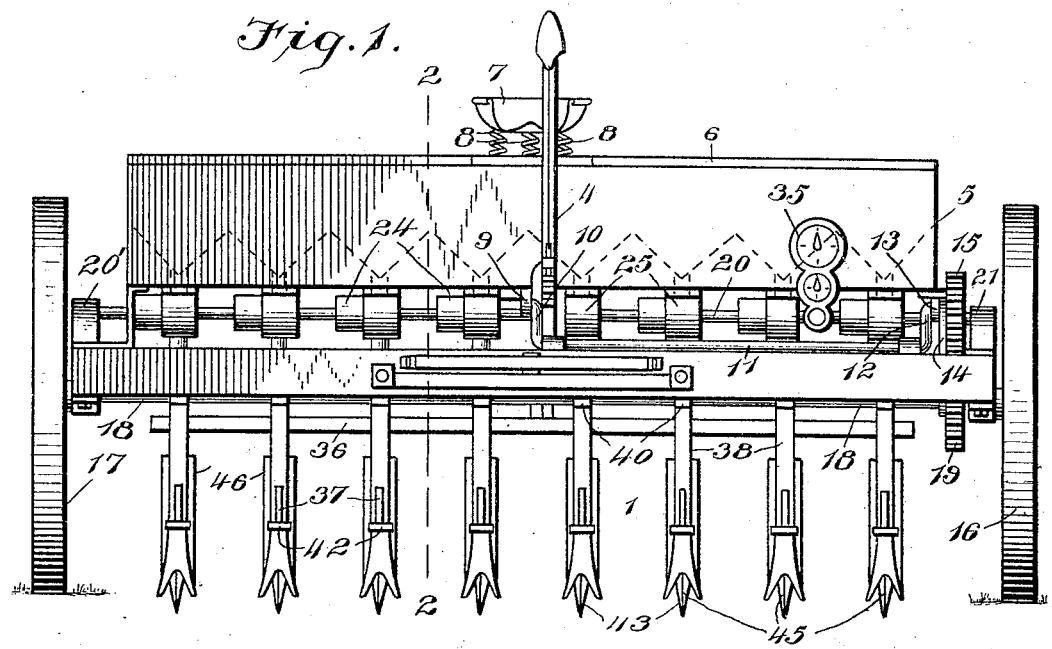
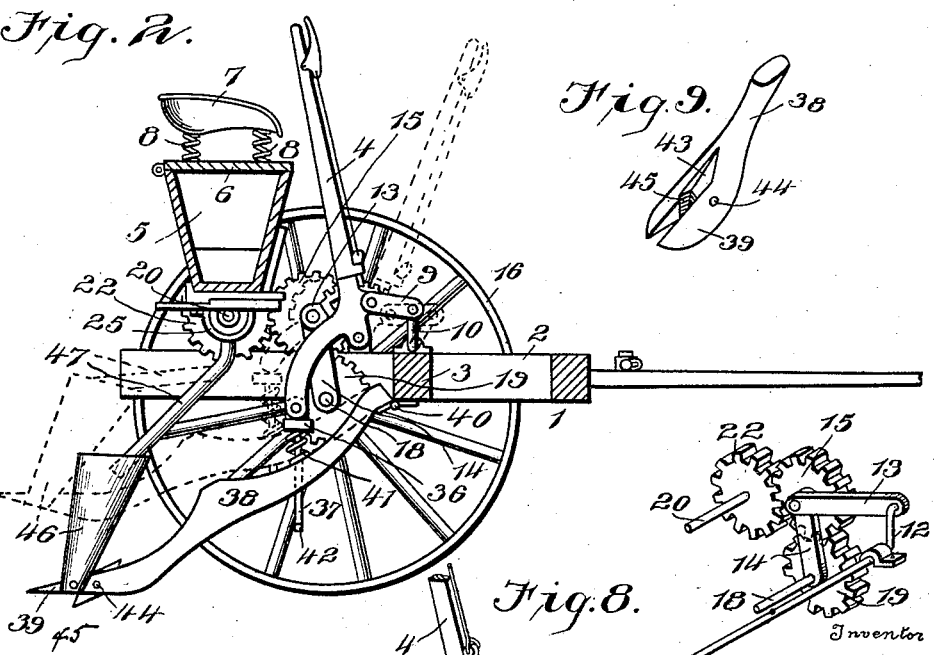
Witnesses
T. P. Britt
E. C. Duffy
Inventor
A. M. Highsmith
by
O. E. Duffy & Son
Attorneys

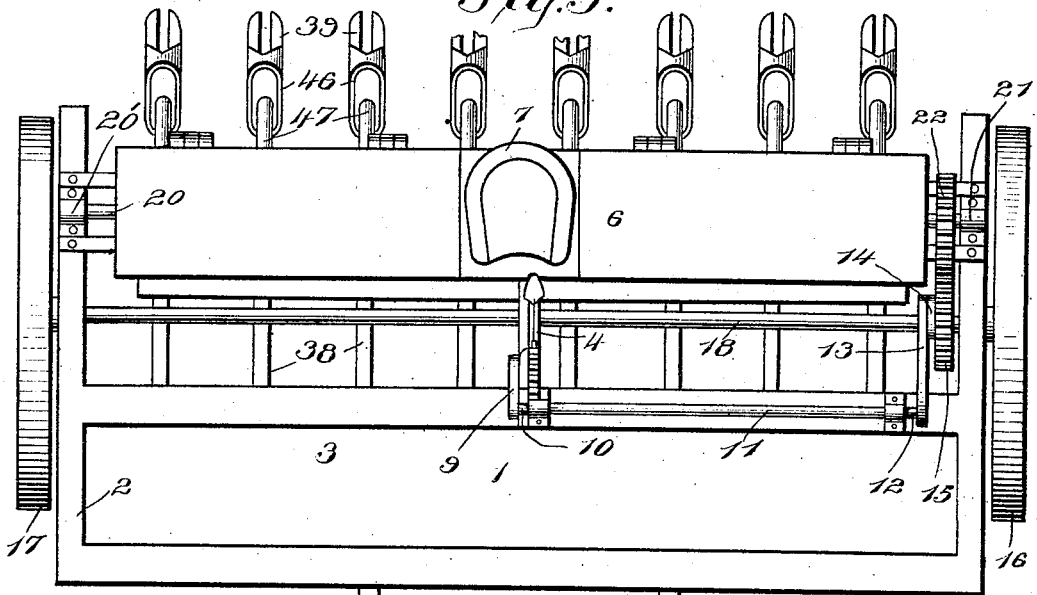
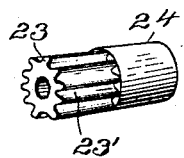
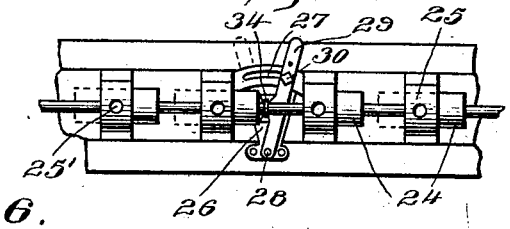
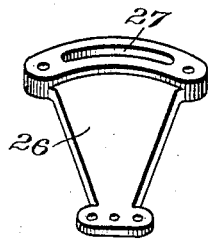
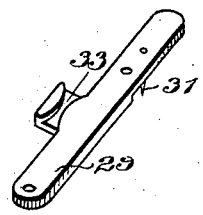
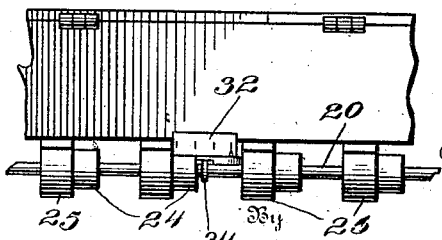

No 773,739. Patented November 1, 1904.

UNITED STATES PATENT OFFICE.

AMOS MILTON HIGHSMITH, OF MONTGOMERY TOWNSHIP, CRAWFORD COUNTY, ILLINOIS.

CLOVER AND GRASS SEEDER.

SPECIFICATION forming part of Letters Patent No. 773,739, dated November 1, 1904.

Application filed March 25, 1904. Serial No. 200 061. (No model.)

*To all whom it may concern:*

Be it known that I, AMOS MILTON HIGHSMITH, a citizen of the United States, residing in Montgomery township, in the county of Crawford and State of Illinois, have invented certain new and useful Improvements in Clover and Grass Seeders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to seeders and planters, and has for its object to provide a planter which is simple in its construction, easy of operation, strong, durable, and efficient.

A further object of my invention is to provide a planter which is operated by the driving-wheel and which can be thrown in and out of gear with said wheel instantly.

A further object of my invention is to provide a novel planting means.

With these objects in view my invention consists in the novel construction of my planter.

My invention also consists in certain combinations of parts, which will be first fully described and afterward specifically pointed out in the appended claims.

Referring to the accompanying drawings, Figure 1 is a front elevation of the seeder. Fig. 2 is a vertical sectional view taken on line 2 2 of Fig. 1. Fig. 3 is a top plan view of the seeder. Fig. 4 is a fragmentary detail view of the seed regulator and feeding device. Fig. 5 is a fragmentary detail view of the same shown in Fig. 4 in rear elevation. Fig. 6 is a detail perspective of the regulating-quadrant. Fig. 7 is a detail perspective view of the regulator-lever. Fig. 8 is a detail perspective of the operating-lever, showing gearing in detail. Fig. 9 is a perspective view of the drill-tooth and coverer, and Fig. 10 is a perspective view of the toothed feed-wheel and sleeve r follower.

Like numerals of reference indicate the same parts throughout the several drawings, in which—

1 is the planter, which consists of the frame 2, and 3 indicates a cross-bar upon which is fulcrumed the operating-lever 4.

5 indicates the seed-hopper, which is provided with a preferably-hinged cover 6, and a seat 7, mounted on springs 8, is secured on said cover 6. Secured on said operating-lever 4 is a link 9, Fig. 8, which is pivoted to the crank-arm 12 of the rocking rod 11. At the outer end of said rocking rod is a link 13, which is pivoted to a lever 14, upon which is journaled the pinion or wheel 15.

16 and 17 indicate the bearing-wheels of the seeder, said wheel 16 being keyed to its axle 18, so that said axle revolves therewith. Keyed also to said axle 18 is a pinion-wheel 19, which meshes at all times with the pinion 15.

20 indicates the seed-feeding shaft, which is slidably journaled in the boxes 20' and 21. Slidably secured to said shaft 20 is the pinion-wheel 22, which is adapted to mesh with said pinion-wheel 15. Suitably secured on said shaft 20 are the feed-wheels 23 and sleeves 24, which enter the seed-cups 25.

Secured under the hopper 5 is the seed-regulator quadrant 26, which is provided with a slot 27, as shown in Fig. 6. Pivoted to said quadrant at 28 is the regulator-lever 29, and a bolt 30 passes through said lever and through the said slot 27, as shown in Fig. 4. A small indicating-finger 31 is secured on said lever 29, and a suitable scale 32 is marked on the top of said quadrant 26, as shown in Fig. 5. On one side of said lever 29 is a groove 33, which tapers in both directions. Secured on said shaft 20 is an annular flange 34, which is adapted to be engaged by said lever 29, said flange revolving with the shaft 20 within the slot 33 in said lever 29, and a suitable acre-gage 35 is secured to the hopper in any convenient position—as, for instance, as shown in Fig. 1.

Connected to the operating-lever 4, Fig. 2, is a bar 36, and connected to said bar are a series of downwardly-extending pins 37, which pass through the arms or drag-bars 38 of the seed-coverers 39. Said arms 38 are hinged at 40 to a cross-piece 3, and both of said arms are independent of each other. A suitable spring 41 is mounted on said pins 37 between the bar 36 and the arms 38 of the seed-coverers, and said pins 37 are provided at their bottoms with a cross-pin 42.

To refer now to Fig. 9, it will be seen that the seed-coverers 39 are provided with a drill-tooth or furrow-opener 43, which is pivoted at 44 in said seed-coverer, said drill-tooth being provided with a groove 45 in its rear. Secured on said seed-coverer 39 in rear of said drill-teeth are tubes 46, and secured under said seed-cups 25 is a flexible piping 47, the end of which enters the seed-shoe 46.

Having thus described the several parts of my invention, its operation is as follows: In operation the seed is placed in the hopper 5, and the amount to be planted is regulated by means of the regulating-lever 29, as follows: The feed-wheels 23 and sleeves 24 are securely fastened to the slidable shaft 20, and the flange 34 on said shaft is engaged and rotates in the tapered groove 33 in the regulating-lever 29. When said lever is moved, it slides said shaft 20 and causes the said wheels 23 and the sleeves 24 to pass into or out of the seed-cups 25, as may be desired. The seed passing from the hopper 5 through perforations shown in dotted lines in Fig. 1 enters the corrugations 23' in the seed-wheel 23, and as the seed in said perforations is carried around it is forced through the openings 25' in the seed-cups 25 and passes into the flexible piping 47 and is emptied into shoe 46. As said lever 29 is swung one way or the other it forces seed-wheels 23 into or out of the seed-cups 25, so that a greater or less quantity of seed is taken up by the corrugations 23' and forced out, as before described.

In order to throw the seeding apparatus into and out of operation and to simultaneously raise the seed drills and coverers off the soil, the operating-lever 4, which is located conveniently to the operator, is thrown forward, as shown in dotted lines in Fig. 2. This action of said lever rocks the shaft 11 and by means of this connection carries the pinion-wheel 15 out of engagement with the pinion-wheel 22, and as said pinion-wheel 22 revolves the shaft 20, which carries the seeding devices, ceases to revolve and the seed-wheel 23 remains at rest. As before described and as illustrated in Fig. 2, the connection between the said lever 4 and the arms 38 of the seed-coverers is not positive, and the lever 4 can be thrown forward some distance before the pin 42 engages said arm 38 and raises the same. In other words, the arms 38 are capable of considerable movement on the pin 37, so that the drills and coverers accommodate themselves to any unevenness in the soil. The seed passes from the hopper 5 around the seed-wheels and through the seed-cups 25 through the flexible piping 47 and into the shoe 46, which passes between the fingers of the coverer 39. The drill-tooth 43 makes a furrow in the soil, and the seed passes in the grooves 45 in said drill-tooth and is deposited in the furrow made by said drill-tooth and is covered by the fingers of the coverers 39. The said drill-tooth 43 is reversible and has a groove identical with groove 45 on its forward side. The seed is thus distributed and covered in one operation.

Having thus described the several parts of my invention, I do not wish to be understood as limiting myself to the particular construction herein set forth, as various slight changes might be made therein which would fall within the limit and scope of my invention, and I consider myself as clearly entitled to all such changes and modifications.

What I claim as my invention, and desire to secure by Letters Patent of the United States, is—

1. In a seeder the combination with a suitable hopper and a seeding device of a drill-tooth arm having its bottom end bifurcated to form two covering-fingers, a drill-tooth pivoted between said covering-fingers and a shoe secured to said covering-fingers and means for leading the seed from said seeding devices to said shoe, substantially as described.

2. In a seeder, the combination with a suitable hopper and a seeding device of a coverer, a reversible grooved drill-tooth and means for leading the seed from said seeding device in rear of said drill-tooth between the fingers of said coverer, substantially as described.

In testimony whereof I affix my signature in presence of two witnesses.

AMOS MILTON HIGHSMITH.

Witnesses:
J. W. MONTGOMERY,
JOE HILL.